United States Patent [19]

Romano et al.

[11] Patent Number: 4,919,291

[45] Date of Patent: Apr. 24, 1990

[54] METALLURGICALLY IMPROVED TIP-OFF TUBE FOR A VACUUM ENCLOSURE

[75] Inventors: Timothy S. Romano, Goleta; Kenneth L. Gustafson, Buellton, both of Calif.

[73] Assignee: Santa Barbara Research Center, Goleta, Calif.

[21] Appl. No.: 124,220

[22] Filed: Nov. 23, 1987

[51] Int. Cl.[5] .......................... H01J 9/26; H01K 3/12

[52] U.S. Cl. ...................................................... 220/2.2

[58] Field of Search .......................................... 220/2.2

[56] References Cited

U.S. PATENT DOCUMENTS

| | | | |
|---|---|---|---|
| 2,174,381 | 9/1939 | Elder | 220/2.2 |
| 2,441,841 | 5/1948 | Phelps | 220/2.2 |
| 2,491,735 | 12/1949 | Howes | 220/2.2 |
| 2,554,328 | 5/1951 | Grimes | 220/2.2 |
| 2,692,298 | 10/1954 | Dailey | 220/2.2 |
| 3,203,083 | 8/1965 | Obenhaus . | |
| 4,512,488 | 4/1985 | Schwenk | 220/2.2 |

FOREIGN PATENT DOCUMENTS

| | | | |
|---|---|---|---|
| 1163731 | 2/1964 | Fed. Rep. of Germany | 220/2.2 |
| 72526 | 4/1960 | France . | |
| 1284316 | 1/1962 | France . | |
| 7305889 | 11/1973 | Netherlands . | |

*Primary Examiner*—George E. Lowrance
*Attorney, Agent, or Firm*—W. C. Schubert; W. K. Denson-Low

[57] ABSTRACT

A hollow, elongated tip-off tube 12 is comprised of a copper substrate having a layer of gold plating diffused into the surface thereof. The gold is applied over a nickel strike and the tube is heated within a vacuum furnace to diffuse the gold into the copper surface. The gold diffused inner surface of the tube is found to have superior self-welding characteristics and increased strength and durability. The nobility of the inner surface resists the formation of an oxide coating thereon which eliminates the need to clean the inner surface of the tube before pinch-off. Thus, the entrapment of residual cleaning chemicals within the pinch-off area is avoided.

7 Claims, 2 Drawing Sheets

METALLURGICALLY IMPROVED TIP-OFF TUBE FOR A VACUUM ENCLOSURE

FIELD OF THE INVENTION

This invention relates to vacuum enclosures and, in particular, relates to a metallurgically improved tip-off tube for a vacuum enclosure.

BACKGROUND OF THE INVENTION

In order to evacuate an enclosure to a desired low pressure of gas, it is known to provide the enclosure with a hollow tubular member through which the gas is evacuated. After the enclosure has been evacuated to a desired gas pressure, the tip of the tube is crimp sealed under pressure to prevent the entry of external gases into the vacuum enclosure. Typically the tubular member, or tip-off tube, is comprised of copper. During the crimping process a self-welding occurs within the tube, this self-weld providing for hermetically sealing the tube.

It has been found, however, that a number of problems are inherent in the use of such copper tip-off tubes. One problem relates to the relatively small surface area within the tube which comprises the self-weld. As can be appreciated, the greater the surface area which comprises the weld, the greater will be the overall strength and resistance to mechanical loads within this area. This increase in strength is directly related to the reliability and durability of the self-weld and, hence, to the overall reliability and durability of the vacuum enclosure itself.

Another problem related to the use of copper tip-off tubes is the need to remove, before crimping, a layer of copper oxide which is typically found within the tube. This oxide removal is required to insure the quality of the self-weld during the crimping process. This oxide removal is typically accomplished by cleaning the tube with a suitable acid or chemical solvent and possibly also abrasively cleaning the inside of the tube. Not only does this cleaning introduce additional processing steps in the manufacture of the vacuum enclosure, with a consequent increase in manufacturing costs, but traces of the cleaning acid or solvent may remain within the tip-off tube. After crimping the tube, these residual contaminates which are locked in the pinch-off area may diffuse into the vacuum enclosure itself. Inasmuch as vacuum enclosures typically include a "getter" to absorb trace amounts of atmospheric gases and molecular species which may outgas from assemblies within the enclosure, these additional contaminants may overload the getter, resulting in the failure of the getter.

SUMMARY OF THE INVENTION

The foregoing problems of the prior art are overcome and other advantages are realized by, in accordance with the method and apparatus of the invention, a hollow, elongated tip-off tube which is comprised of a copper substrate having a layer of nickel strike and gold plating applied to at least the inner surface of the tube, the layer of gold plating subsequently being diffused through the nickel and into the copper to yield an oxidation and corrosion resistant surface, whereby the tube is metallurgically improved.

In accordance with a method of the invention, precut tip-off tubes comprised of copper are flashed with a nickel coating and are then plated with a layer of, for example, 99.9 gold. After plating the tube is placed in a vertical positioning fixture and the tube and fixture are thereafter placed in a vacuum furnace. The tube is heated to approximately 1700 degrees F and held at this temperature for up to ten minutes at a pressure range of approximately $10^{-5}$ Torr. During this heating process the gold plating diffuses into the surface of the copper. After removal from the vacuum furnace the tube has the quality and luster of pink gold. The tube is now suitable to be either furnace brazed into a vacuum assembly or brazed to a collar.

The self-welding characteristic of the gold diffused tip-off tube are greatly superior to that of the copper tip-off tubes of the prior art. In addition, the tube has other superior mechanical properties such as increased strength, ductility and durability. Furthermore, because of the nobility of the inner surface of the tube, oxide removal processing steps are not required. Thus, there is no danger of introducing residual contaminants from the cleaning process into the inner region of the tube and the vacuum enclosure itself.

BRIEF DESCRIPTION OF THE DRAWINGS

These and other aspects of the present invention will be more fully set forth in the detailed description of the invention taken in conjunction with the accompanying drawings wherein.

DETAILED DESCRIPTION OF THE INVENTION

Figure 1:
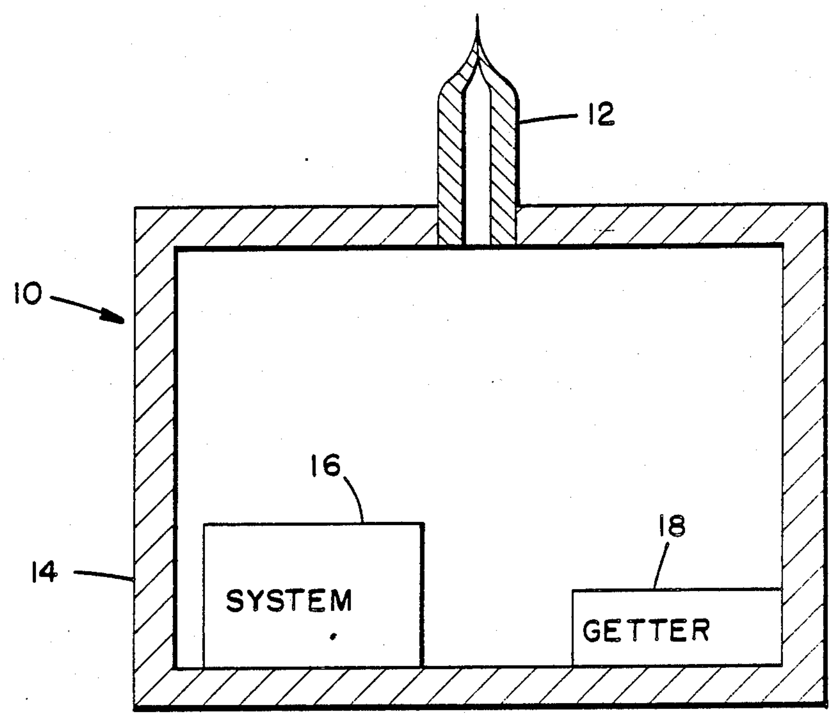
FIG. 1 is a cross-sectional view of a typical vacuum enclosure having a tip-off tube.

Referring to FIG. 1 there is shown a cross-sectional view of a typical vacuum enclosure 10 having a tip-off tube 12 constructed in accordance with the method and apparatus of the invention. Enclosure 10 is comprised of an outer wall 14 which encloses within a desired system 16, such as an electrical, electronic, or optical system. In order that the enclosure 10 may be evacuated to a desired reduced gas pressure, the tip-off tube 12 is integrally joined with the enclosure 10. A vacuum generator (not shown) is coupled to the outer end of tip-off tube 12 for evacuating the gas from within the enclosure 10. When the gas pressure has been reduced to a desired level, a portion of the outer end of tip-off tube 12 is crimped under pressure to seal the tip-off tube 12. This sealing of the tip-off tube 12 results in a hermetic seal of the enclosure 10 and substantially prevents the reentry of gas molecules into the enclosure 10.

Inasmuch as the system 16 may contain materials such as conformal coatings on electronic printed circuit boards and other similar materials, under vacuum conditions outgasing of various molecular species may occur from the system 16. In order to prevent the contamination of the inner region of enclosure 10 by these outgasing species, a getter 18 may be provided to absorb these species. The getter 18 may also absorb gas molecules which were not evacuated during the evacuation of the enclosure 10.

In practice, enclosure 10 may be assembled from two symmetrical halves, the halves being joined together along an edge thereof by welding or some other suitable technique for providing an air tight seal. A tip-off tube 12 is typically attached to the enclosure such as by welding or brazing or some other suitable, well known technique. When the assembly of enclosure 10 is complete the enclosure 10 forms an enclosure which is operable for being evacuated and hermetically sealed. Other openings may be provided in the enclosure for permitting the passage for electrical cables (not shown) and other similar devices through a wall of the enclosure 10 in order that the system 16 may thereby be coupled to external devices. Of course, these other openings are also hermetically sealed by gaskets and other suitable means.

As can be appreciated, the maintenance of the evacuated condition within the enclosure 10 is in large part dependent upon the effectiveness of the seal formed within the tip-off tube 12. Not only must this seal effectively prevent the in-flow of gas molecules into the enclosure, the seal must also have an inherent resistance to mechanical vibration and shock. Furthermore, the tip-off tube 12 should not in itself introduce any contaminants into the vacuum enclosure 10.

In accordance with a method of the invention, it has been found that copper tip-off tubes which have a gold plating diffused into an inner surface thereof provide a number of advantages over the copper tip-off tubes of the prior art. In order to fabricate such a gold diffused tip-off tube, the following fabrication steps may be employed.

EXAMPLE

A precut, hollow tubular substrate comprised of OFHC (Oxygen Free, High Conductivity) copper or OF (Oxygen Free) copper has a nickel strike or flash coating applied thereto. This nickel coating may be applied by a nickel sulfamate bath (Watts bath) or any other process suitable for the electrolytic deposition of nickel on copper. In general, the nickel flash should substantially cover the surface of the copper substrate. Next, a layer of 99.9 pure gold is elecotrolytically plated over the nickel coating. The gold plating may be applied to a typical thickness of up to 0.00003 inches on the outer surface of the substrate and to a similar thickness on the inner surface of the substrate. Plating the entire substrate is of course a less complex operation than selectively plating only the inner surface of the substrate, it being realized, however, that only the inner surface of the substrate may need to be plated in order to realize the advantages made possible by the invention. Copper is a preferred material for the substrate due to its high ductility and good self-welding characteristics when subjected to a compressive force, however other suitable substrate materials having similar properties may be used. Similarly, another plating material may be substituted for gold so long as the plating material has a nobility which resists oxidation, is malleable and, also, is capable of being diffused into the substrate to provide for improving the self-welding characteristics of the substrate.

After plating, the substrate is placed in a fixture which positions the substrate in a vertical position. The fixture having the plated substrate, or a plurality of plated substrates, positioned thereon is then inserted into a vacuum furnace. The substrate is heated within the vacuum furnace to a temperature of from approximately 1700° F. to 1750° F. and held at this temperature for a time typically less than ten minutes and at a pressure of approximately $10^{-4}$ Torr or less. During this period, the gold plating previously applied to the surfaces of the substrate diffuses into the surfaces of the substrate to a depth of, typically, 0.0008 to 0.0002 inches. When cool the substrate or substrates are removed from the furnace. The tip-off tube surfaces have been found to assume the quality and luster of pink gold. The gold diffused tip-off tube is now ready for further processing steps wherein the tube may be incorporated within a vacuum enclosure such as by furnace brazing. Similarly, a tip-off collar may be brazed to the tube.

Thermal cycling of the plated tubes serves to metallurgically lock the plated layers to the substrate. To maintain the enhanced properties brought about by the gold, the nickel underlayer acts as a barrier to excessive diffusion at the elevated temperature. After thermal cycling, no discernible line of nickel remains. The Cu/Ni/Au system anchors the Au rich surface to the substrate. Without the nickel flash barrier, a Au/Cu binary system will readily assimilate itself at elevated temperatures, thereby lessening the beneficial effects of the Au plating.

It has been found that "re-visiting" the original diffusion temperature, or a lower temperature, does not adversely effect the nobility of the gold diffused surfaces.

Figure 2:
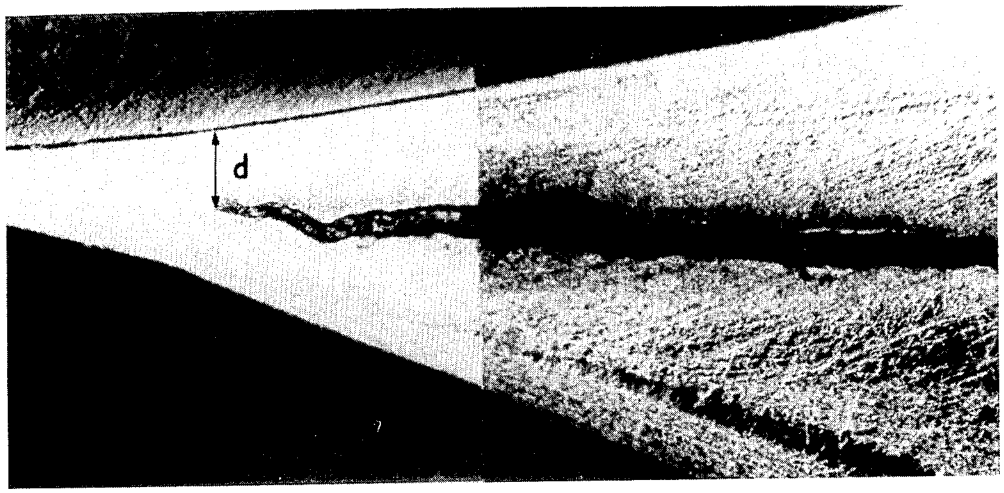
FIG. 2 is a photomicrograph showing a cross-section of the self-weld area of a copper tip-off tube of the prior art.
Figure 3:
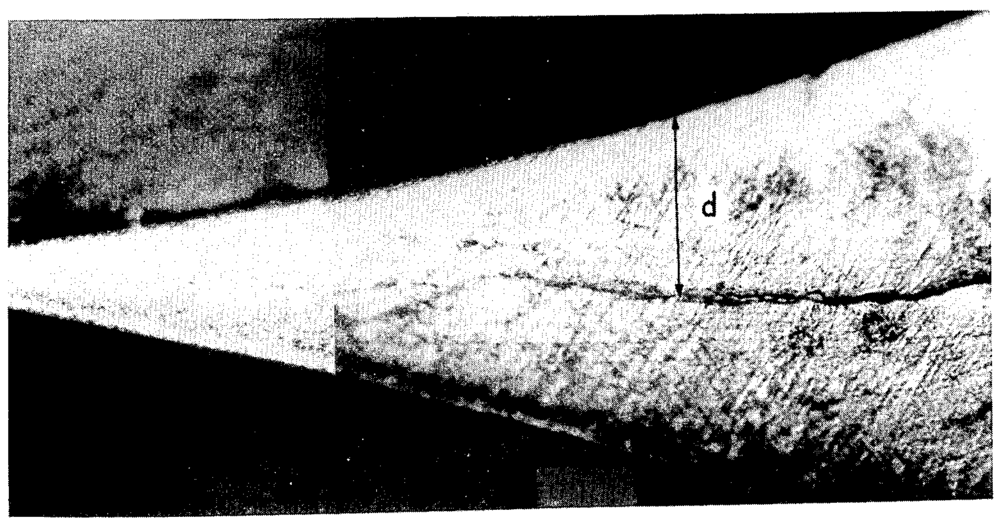
FIG. 3 is a photomicrograph showing a cross-section of the self-weld area of a gold diffused tip-off tube in accordance with the apparatus and method of the invention.

Referring now to FIGS. 2 and 3, there are shown photomicrographs which illustrate cross-sectional views of a copper tip-off tube of the prior art and a gold diffused tip-off tube fabricated in accordance with a method of the invention, respecively. Both photomicrographs show a terminal portion of the tube within the self-weld portion formed during the crimping of the tube. The magnification in both photomicrographs is 250 X. As can be seen in FIG. 2, the self-weld area is significantly smaller than in the tip-off tube of FIG. 3. This results in an increased wall thickness represented in each Figure by the letter d. The wall thickness d is measured from a point wherein crack closure becomes evident. The self-weld area extends from the point labeled d to the terminal end of the tip-off tube in a direction to the left of d in FIGS. 2 and 3. As can be seen, the self-weld area has been increased by a factor of approximately three in the tip-off tube of FIG. 3 relative to the tip-off tube of the prior art illustrated in FIG. 2.

In addition to this significant improvement in self-welding of the tip-off tube, the tip-off tube has been found to have a greater strength For example, self-welded copper tip-off tubes of the prior art have been found to fail with a resulting loss of hermiticity with only a slight mechanical load on the end of the tube. However, a gold diffused (alloyed) tip-off tube has been hammered repeatedly without loss of hermiticity, thereby greatly improving the reliability and durability of a vacuum enclosure incorporating such a tip-off tube. Furthermore, the requirement of the prior art copper tip-off tubes that a copper oxide coating be removed prior to pinch off has been eliminated inasmuch as the nobility of the surfaces resists the formation of such an oxide coating. Furthermore, this prior art cleaning step which introduced contaminants into the tip-off tube, the contaminants being locked into the pinch off area and thereafter entering the vacuum enclosure itself, is eliminated. Thus, the problem of overloading the getter within the enclosure is overcome by a tip-off tube fabricated in accordance with the invention.

As will be appreciated, a preferred embodiment of the present invention has herein been presented and modifications and alterations of the preferred embodiment may occur to those skilled in the art. Therefore, the invention is not to be limited by the preferred embodiment disclosed herein, the invention is instead intended to be limited by the appended claims.

What is claimed is:

1. A hollow elongated vacuum sealing member, said member being operable for having a compressive force applied thereto for crimp sealing an inner portion of said member, said member comprising:

a hollow metallic tubular substrate comprising an inner and an outer surface; and a metallic layer comprised of a noble metal formed upon at least said inner surface of said substrate, said layer being diffused to a predetermined depth within at least said inner surface.

2. A member as defined in claim 1 wherein said metallic layer comprises substantially pure gold.

3. A member as defined in claim 2 wherein the predetermined depth is within a range of approximately 0.0008 to 0.0002 inches.

4. A member as defined in claim 3 wherein said substrate comprises OFHC copper.

5. In a hollow metallic tip-off tube communicating at one end with an inner region of a vacuum enclosure, said tube being operable for being coupled at an opposite end to a vacuum generating means for evacuating said inner region, said tube further being operable for having a compressive force applied thereto for crimp-sealing said tube to provide a self-welded portion operable for providing a hermetic seal for maintaining said inner region in an evacuated condition, the improvement comprising:

a layer of metal diffused into at least an inner surface of said tip-off tube said layer of metal having properties which resist the formation of an oxide coating on said layer.

6. A tip-off tube as claimed in claim 5 wherein said layer of metal comprises gold.

7. A tip-off tube as claimed in claim 6 wherein said layer is diffused to a depth of at least 0.00008 inches within said inner surface.

* * * * *